Inventor
WALTER H. LUNDQUIST
By Paul H. ...
Attorneys

June 16, 1936.   W. H. LUNDQUIST   2,044,506
FOOTBALL GAME
Original Filed Nov. 17, 1933    4 Sheets-Sheet 2
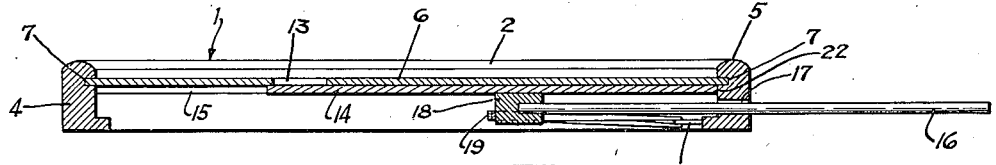
Fig.2
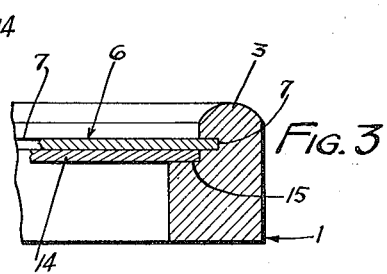
Fig.3
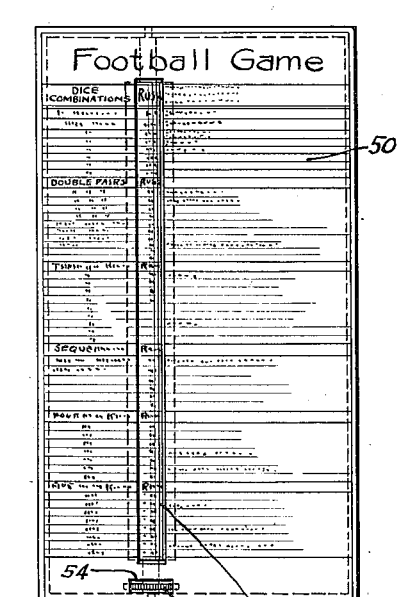
Fig.8
Fig.4
Inventor
WALTER H. LUNDQUIST
By Paul, Paul & Moore
ATTORNEYS June 16, 1936. W. H. LUNDQUIST 2,044,506
FOOTBALL GAME
Original Filed Nov. 17, 1933 4 Sheets-Sheet 3
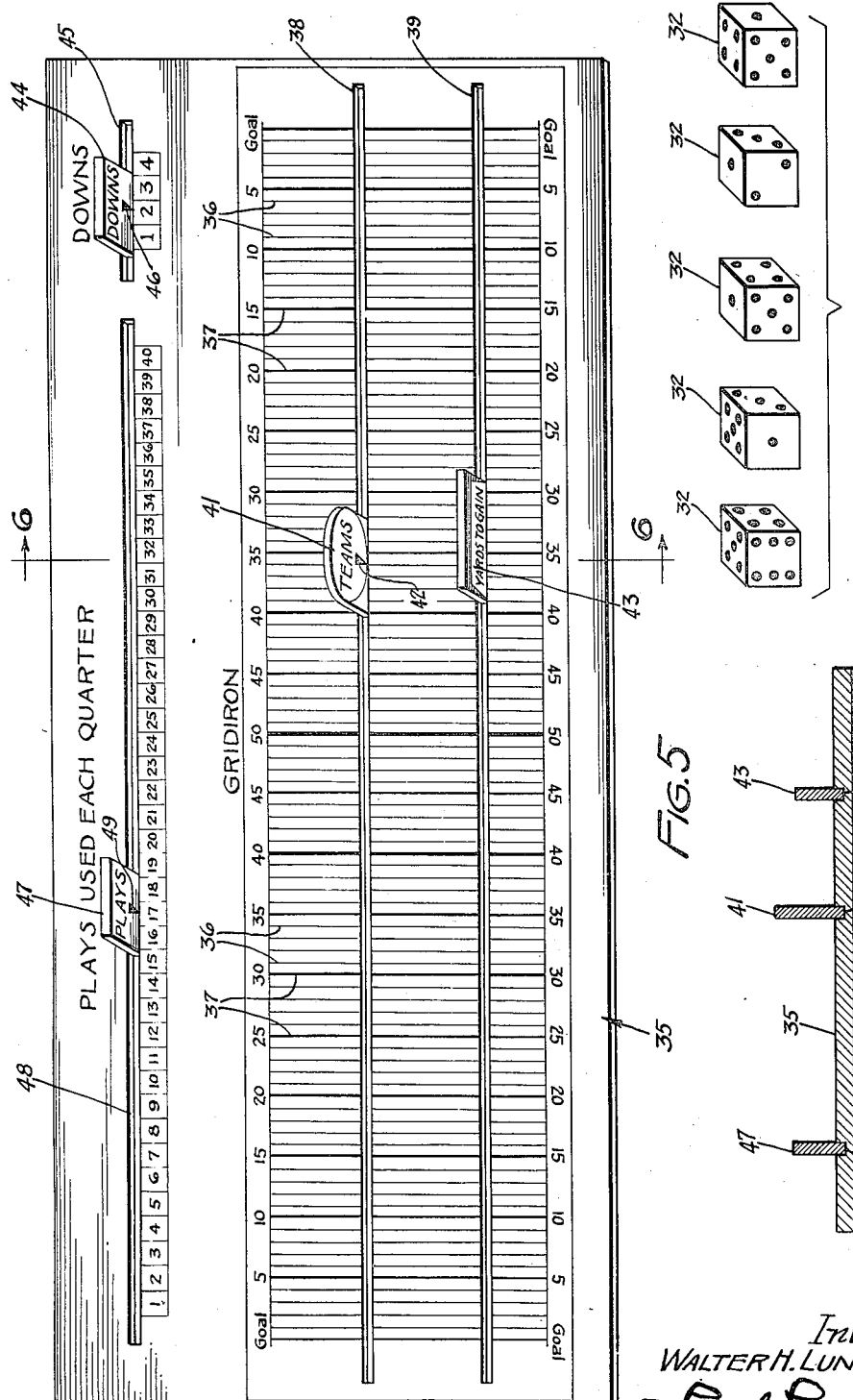
Inventor
WALTER H. LUNDQUIST
By
ATTORNEYS June 16, 1936.  W. H. LUNDQUIST  2,044,506
FOOTBALL GAME
Original Filed Nov. 17, 1933   4 Sheets—Sheet 4

FOOTBALL-GAME

| DICE COMBINATIONS | RUSH YARDS | PASS YARDS | PUNT YARDS | PUNT RETURN YARDS | KICK OFF YARDS | KICKOFF RETURN YARDS | THE FOLLOWING CHANGES ARE EFFECTIVE WHEN ○ OR ● APPEAR, AND DICE COMBINATION INCLUDES NUMERALS NOTED BELOW. |
|---|---|---|---|---|---|---|---|
| No Combination | No Gain | ○ | ● | None | 30 | None | ● FUMBLED AND RECOVERED / ○ PASS INCOMPLETE |
| Single Pairs | | | | | | | |
| 1s | ● No Gain | Incomplete | 30 | NONE | 40 | NONE | ●-2 AND 6- THE RESULT IS A 3-YARD GAIN |
| 2s | ● 1 | ○ '' | 35 | '' | 40 | 5 | ○ 3 AND 5- THE RESULT IS A 2-YARD LOSS / ○ 3 AND 5- THE RESULT A 4-YD. COMPLETED PASS |
| 3s | ● 1 | ○ '' | 35 | '' | 40 | 5 | ●4 / ○4 |
| 4s | ● 1 | ○ '' | 35 | '' | 40 | 5 | ●1 / ○1 |
| 5s | ● 2 | ○ '' | 35 | '' | 40 | 5 | ●3 / ○3 |
| 6s | ● 2 | ○ '' | 35 | '' | 40 | 5 | ●1 AND 5- / ○1 AND 5 |
| Double Pairs | RUSH | PASS | PUNT | PUNT RETURN | KICK OFF | KICKOFF RETURN | |
| 1s AND 2s | ● 3 | '' | 40 | 2 | 40 | 8 | ●6-THE RESULT IS A 1-YARD GAIN |
| 2s AND 3s | ● 3 | '' | 40 | 2 | 40 | 8 | ●5-THE RESULT IS A 4-YARD GAIN |
| 3s AND 4s | ● 3 | ○ '' | 40 | 2 | 40 | 8 | ●2 / ○2 |
| 4s AND 5s | ● 3 | ○ '' | 40 | | | | ●1 / ○1 |
| 5s AND 6s | ● 4 | ○ '' | 40 | | | | ●4 / ○4 |
| 1s AND 3s OR 2s AND 4s | ● 4 | '' | 40 | | | | ●5 / ○5 |
| 1s AND 4s OR 2s AND 5s | ● 4 | Complete 6 | 40 | | | | ●6 / ○6 |
| 1s AND 5s OR 2s AND 6s | ● 5 | ○ 6 | 40 | | | | ●4 THE RESULT IS A 2-YARD GAIN / ○4 RUN EXTENDED TO 9-YARDS |
| 1s AND 6s OR 3s AND 5s | ● 5 | ○ 6 | 40 | | | | ●4- FUMBLED AND RECOVERED |
| 3s AND 6s OR 4s AND 6s | ● 5 | ○ 6 | 40 | | | | ●1- THE RESULT-A 4 YD. GAIN / ○1- RUN EXTENDED TO A TOUCHDOWN. |
| Three of a Kind | RUSH | PASS | PUNT | PUNT RETURN | KICK OFF | KICKOFF RETURN | |
| 1s | ● 6 | 10 | 45 | 6 | 50 | ● 12 | ●2 / ○2 |
| 2s | ● 6 | 10 | 45 | 6 | 50 | ● 12 | ●3 / ○3 |
| 3s | ● 6 | | | | | | ●4 / ○4 |
| 4s | ● 6 | | | | | | ●5 / ○5 |
| 5s | ● 6 | | | | | | ●6 / ○6- PASSED 35 YDS. INTERCEPTED / ○1- 6 YARD GAIN |
| 6s | 6 | | | | | | ○1- 15 YARDS PENALTY |
| Sequences | | | | | | | |
| 1 TO 5 OR 2 TO 6 | 10 | 15 | 50 | 15 | OVER GOAL | 25 | |
| Pair & Three of a Kind | RUSH | PASS | PUNT | PUNT RETURN | KICK OFF | KICKOFF RETURN | |
| 1s AND 2s OR 1s AND 3s | 8 | 10 | 50 | 10 | 55 | 18 | |
| 2s AND 4s OR 2s AND 5s | 12 | | | | | | |
| 2s AND 6s OR 3s AND 4s | 12 | | | | | | |
| 3s AND 5s OR 3s AND 6s | 15 | | | | | | |
| 4s AND 5s OR 4s AND 6s | 18 | | | | | | |
| 5s AND 6s | 20 | | | | | | |
| Four of a Kind | RUSH | PASS | PUNT | PUNT RETURN | KICK OFF | KICKOFF RETURN | |
| 1s | ● 20 | 25 | 55 | 10 | OVER GOAL | 25 | ● 6- RUN EXTENDED TO A TOUCHDOWN |
| 2s | ● 20 | 25 | 55 | ○ 12 | '' | ● 25 | ● 1- BALL CARRIED AND FUMBLED- OPPONENTS BALL |
| 3s | ● 20 | | | | | ● 25 | ●2- '' '' '' '' '' '' |
| 4s | ● 20 | | | | | ● 25 | ●3- '' '' '' '' '' '' |
| 5s | ● 22 | | | | | ● 25 | ●4- '' '' '' '' '' '' |
| 6s | ● 25 | | | | | ● 25 | ●5- '' '' '' '' '' '' |
| Five of a Kind | RUSH | PASS | PUNT | PUNT RETURN | KICK OFF | KICKOFF RETURN | |
| 1s | 28 | 30 | 60 | 20 | OVER GOAL | 25 | |
| 2s | 28 | 30 | 60 | 25 | '' | 27 | |
| 3s | 28 | 30 | 60 | 27 | '' | 28 | |
| 4s | 30 | 35 | 65 | 30 | '' | 32 | |
| 5s | 30 | 40 | 65 | 35 | '' | 35 | |
| 6s | 30 | 50 | 65 | 40 | '' | 40 | |

FIG.9

Inventor
WALTER H. LUNDQUIST
By Paul, Paul & Moore
ATTORNEYS

Patented June 16, 1936

2,044,506

UNITED STATES PATENT OFFICE 2,044,506

FOOTBALL GAME

Walter H. Lundquist, Minneapolis, Minn.

Application November 17, 1933, Serial No. 698,417
Renewed November 11, 1935

2 Claims. (Cl. 273—94)

This invention relates to new and useful improvements in football games, and concerns itself more particularly to the provision of such a game which is played in accordance with standard football rules, and wherein the various plays are called in much the same manner as in a regular football game.

An object of the invention is to provide a football game comprising a chart having certain information and other indicia thereon relating to different plays of the game, and a set of dice or playing pieces cooperating with means on said chart to indicate the result of each play.

A further object of the invention resides in the provision of a football game comprising a chart provided with a column of dice combinations and also having a plurality of rows of numerals and other indicia thereon, and each of said rows having a heading designating a certain play of the game, and means being provided whereby each player may select or call the particular play he wishes to execute, the result of which play is determined by a set of dice which, when thrown, will designate a dice combination to be used for determining the result of each play called, the numeral on said chart of the play called, which is alined with the dice combination thrown, indicating in yards the result of the play.

Other objects of the invention reside in the novel construction of the chart and the means provided in connection therewith whereby each player may quickly select the particular play he wishes to execute; in the provision of a football game comprising a chart having dice combinations thereon, and a full set of dice for determining the dice combination to be used, each dice combination being alined with certain play results; in the provision of a football game comprising a chart having certain information thereon relating to football plays, and a slider or movable member operable in connection therewith to conveniently select each play as the game progresses; in the provision of such a game using a full set of dice for determining the result of each play, and whereby a large number of plays are made possible, as in a regular football game; in the means provided on the chart whereby the result of the play initially indicated on the chart, by the dice combination thrown, may be changed, whereby it may result in a loss, or, in an extended run; in the construction of the gridiron board which represents a football field and is laid off in yard lines in substantially the same manner as a regular football field, and has a guideway therein for receiving an element representing a football, and whereby the latter may be conveniently moved forwardly and backwardly on the field to show at all times the exact location of the ball while the game is in progress; in the means provided in connection with the gridiron board for indicating the number of yards to be gained in four downs; in the means for recording the number of downs used, and the means for recording each play as the game proceeds, and which determines the length of the game; and, in the provision of a game apparatus of the character described which is extremely simple and inexpensive in construction and operation, and which embodies substantially all of the usual plays executed in a regulation game, and is interesting and instructive, whereby persons not familiar with the game of football, may gain a wide knowledge of the game in a comparatively short time.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown, as various changes may be made within the scope of the claims which follow.

In the drawings:

Figure 2 is a cross-sectional view on the line 2—2 of Figure 1, showing the means for manipulating the slide to select the different plays;

Figure 3 is an enlarged detail sectional view on the line 3—3 of Figure 1, showing the means for supporting the slide;

Figure 4 is a plan view showing the slide removed;

Figure 5 is a plan view of the gridiron board, showing the means provided thereon for recording the number of plays, the number of downs played, the yards to be gained for each set of downs and the means for indicating the position of the ball on the field;

Figure 6 is a cross-sectional view on the line 6—6 of Figure 5;

Figure 7 is a perspective view showing a set of dice or playing pieces;

Figure 8 is a view showing a game of slightly different construction wherein a roller is used in lieu of the slide shown in Figure 1; and Figure 9 is a view showing the game in a simplified form.

Figure 1:
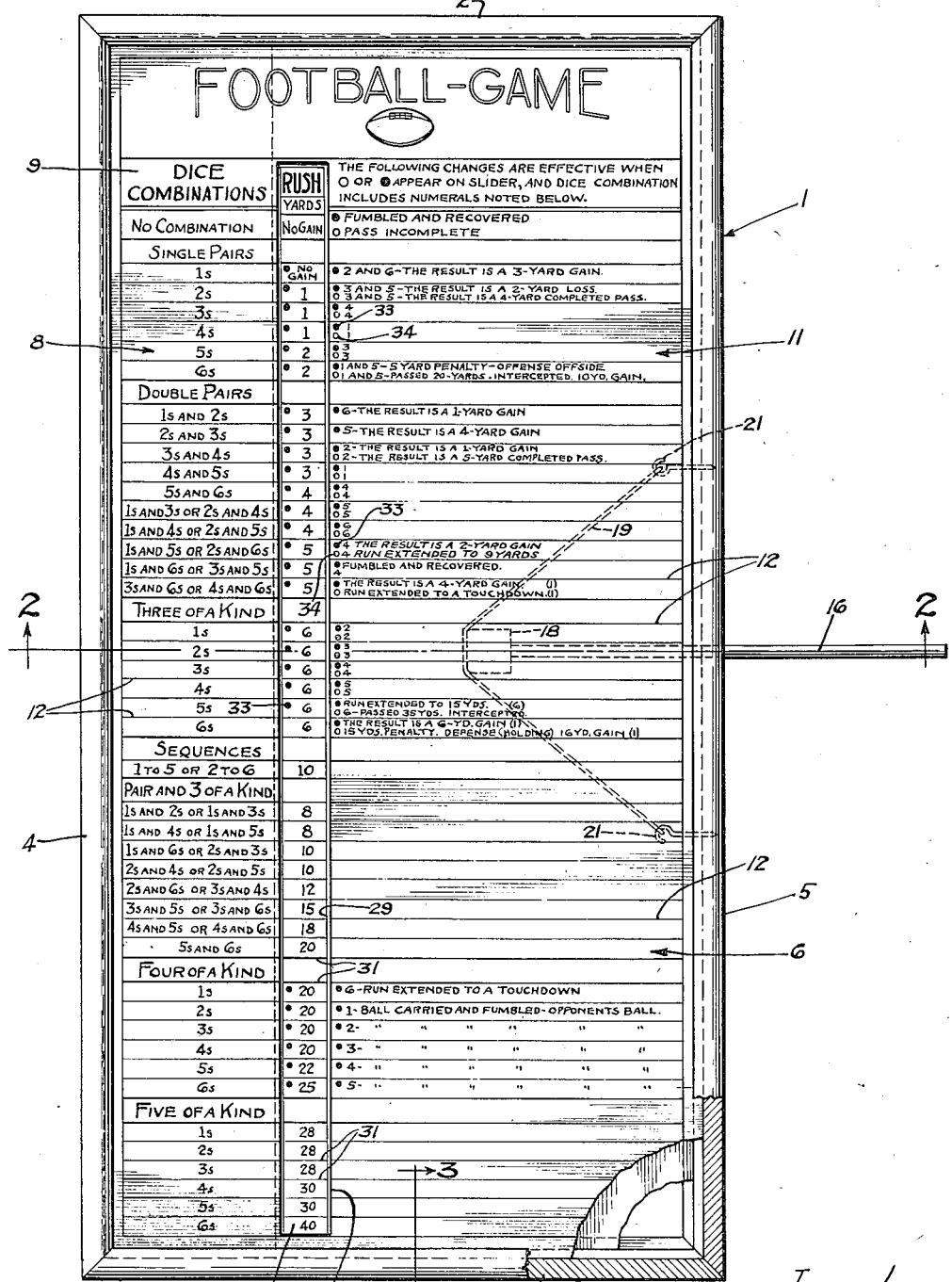
Figure 1 is a plan view of my improved game apparatus showing the chart and the dice combinations provided thereon, and other information and indicia relating to football plays.

The novel football game herein disclosed, and as shown in Figures 1 and 2, comprises a rectangular frame 1, composed of end pieces 2 and 3, and side rails 4 and 5. A chart, indicated generally by the numeral 6, is supported in the frame 1 and has its marginal edges supported in suitable grooves 7, provided in the frame members, as best shown in Figure 2.

The chart 6 is shown provided at the left hand side with a column of dice combinations, indicated generally by the numeral 8, and having a suitable heading 9. Upon the opposite side of the chart, there is shown a column 11 comprising information and other indicia relating to football plays. The chart is provided with a plurality of horizontally disposed lines 12, between which the dice combinations are printed, and between which the information appearing in the column 11 also is printed. An elongated opening 13 is provided in the chart 6, and extends substantially from the bottom thereof to a point adjacent its top. The elongated opening 13 is interposed between the columns 8 and 11.

In the form shown in Figures 1 and 2, a member or slide 14 is supported in the frame 1 beneath the chart 6, and has its ends received in suitable guides 15, whereby said slide may be relatively moved beneath the chart, as will readily be understood by reference to Figure 2. An operating member 16 projects through a guide aperture 17, provided in the side rail 5, and has its inner end detachably connected to a block 18 suitably secured to the bottom of the slide 14. A suitable tensions means, such as a spring or rubber band 19, is shown having its intermediate portion engaging the block 18, and its ends suitably secured to the side rail 5 by such means as eye bolts or hooks 21. The tension member 19 constantly urges the slide in a direction towards the right, when viewed as shown in Figures 1 and 2, so that the right hand edge 22 thereof is normally seated against the side rail 5 of the frame.

Vertically disposed rows of numerals are provided upon the slide 14, preferably adjacent one side thereof, as shown in Figure 4. These rows have suitable headings 23, 24, 25, 26, 27, and 28, designating different plays which are common to the game of football. The rows of numerals on the slide 14 are separated by vertically disposed lines 29, and the numerals in each row are separated by horizontally disposed lines 31. The spacing between the horizontal lines on the slide 14 corresponds to the spacing between the horizontal lines 12 on the chart 6, so that when the slide is positioned beneath the chart, as shown in Figures 1 and 2, the horizontal lines 31 on the slide will be alined with the horizontal lines 12 on the chart. The spacing between the vertically disposed lines 29 of the slide corresponds substantially to the width of the slot or elongated opening 13 in the chart, whereby when the slide is in its normal position, with its edge 22 engaged with the side rail 5, as shown in Figures 1 and 2, the row of numerals thereon, under the heading "Rush", will be alined with the slot 13, whereby the numerals in said row may readily be seen, as best shown in Figure 1.

By thus movably mounting the slide 14 beneath the chart 11, each player may selectively call each play which he wishes to attempt. In other words, if a player elects to punt, the slide will be moved to the left from the position shown in Figure 1, until the heading "Punt", appears at the upper end of the slot or opening 13. He will then proceed to determine the dice combination to be used for indicating the result of the play, as will subsequently be described.

To determine the result of each play, a plurality of dice or playing pieces 32 are provided, preferably five in number, as in an ordinary set of dice, shown in Figure 7. These dice are thrown or rolled in the usual manner, and the dice combination appearing on the top faces thereof, following each throw, determines the result of the play as, for example, if the player having the ball elects to "Rush", and the dice combination thrown results in a pair of fives and a pair of aces, as shown in Figure 7, the result will be a five yard gain, as shown in Figure 1.

To render the game more realistic and interesting, certain of the numerals on the slide 14 are prefixed with symbols 33 and 34. Corresponding symbols 33 and 34 prefix the information appearing in the column 11 on the right hand side of the chart. The symbols 33 and 34 are provided for the purpose of creating changes in the results of plays, indicated on the slide 14, when certain dice combinations are thrown. In other words, should a pair of aces and a pair of fives be thrown, as shown in Figure 7, and the selected play is a "Rush", then if the odd dice, shown at the right hand side of Figure 7, is a four, as there shown, the resultant play, instead of being a five yard gain, as noted by the numeral on the slide alined with the dice combination thrown, will be a two yard gain. This results because the numerals 5 and 4 on the slide 14 and column 11, respectively, which are alined with the dice combination thrown, are prefixed with the symbols 33, as shown in Figure 1, and the resultant play must then be determined by the notation, "The result is a two yard gain", which information follows the numeral 4 in the column 11. The symbols 33 and 34 add the element of chance to each play, which makes the game more realistic, in that the player never knows just what the final result of the selected play will be until the dice combination has been determined by rolling the dice, as above described.

Should a player elect to throw a "Pass", the slide 14 will be moved so that the heading "Pass", will appear at the upper end of the opening 13. He will then throw the dice, and if the same dice combination shown in Figure 7, should be thrown, the result of the play, instead of being a six yard completed pass, as indicated by the numeral 6 on the slide, will be a run, resulting in a nine yard gain. This change in the play results because the symbol 34 appearing on the slide adjacent to the numeral 6, corresponds to the symbol 34 in the column 11 which is followed by the numeral 4, corresponding to the odd dice thrown, and which numeral is followed by the notation "Run extended to nine yards."

Another important feature of the invention resides in the construction of the gridiron board shown in Figure 5, and generally indicated by the numeral 35. This board has one section laid off in yard lines 36 and 37 to represent a football field. A row of numerals is provided at each side of the playing field, or the ruled section of the gridiron board, and these numerals are alined with the heavier yard lines 37 and indicate the distance in yards from the ends of the field towards the fifty yard line, or the center of the field, in the same manner as on a regular football field.

Guideways 38 and 39 are provided in the surface of the board 35 and extend substantially the full length thereof, as shown. In one of these guideways, an element 41 is slidably mounted. This element represents the football, and is movable in the guideway 38, whereby it may be moved forwardly and backwardly on the field, as determined by the result of each play. An arrowhead 42 is provided on the ball element 41 for accurately placing it upon the field.

Means is also provided for indicating the number of yards to be made for each set of downs, and is shown as consisting of a slider 43 mounted for movement lengthwise of the field in the guideway 39. This slider 43 represents the "Linesmen", and is moved at the completion of each set of downs.

The means for recording the number of downs consists of a member 44 mounted for sliding movement in a guideway 45, shown provided in the upper right hand corner of the gridiron board 35, when viewed as shown in Figure 5. Numerals 1, 2, 3, and 4, are provided adjacent to the guideway 45 and cooperate with an arrow-head 46 on the member 44 to indicate the number of downs played. In Figure 5, the downs member 44 is shown positioned to indicate the second down.

Means is also provided for recording the number of plays played during the game, and consists of a member 47 mounted for sliding movement in a guideway 48 provided in the upper portion of the board, as shown in Figure 5. A series of numerals are arranged adjacent to the guideway 48, and cooperate with an arrow-head 49 on the member 47 to record each play as the game progresses. In Figure 5, the member 47 is shown recording the seventeenth play. When the member 47 is used, the length of the game is determined by a predetermined number of plays, and not by time, as is now customary. In the drawings, I have shown each quarter consisting of forty plays, whereby a full game will consist of one hundred and sixty completed plays.

Two, three, or four persons may play the game at the same time. If four are to participate, two players will represent the two teams that are to oppose each other, and a third player may act as "Umpire", and operates the slide 14 on the chart, and a fourth player acts as "Head linesman", and operates the various elements 41, 43, 44, and 47 on the gridiron.

To start the game, the two players opposing each other will roll one dice each to see who wins the "Toss." The one rolling the highest dice wins the "Toss" and has the choice of "Receiving" or "Kicking off". When the game starts, the "Umpire" shifts the slide 14 so that the heading "Kick off" appears at the top of the opening 13 in the chart. The first player then rolls the dice, and locates the dice combination thrown on the column at the left hand side of the chart, under the heading "Dice combinations." Should he throw, for example, three fours, the "Kick off" will result in fifty yards, which is measured from his own forty yard line. The ball 41 is then placed on his opponent's ten yard line. The next player then throws the dice and the "Umpire" shifts the slide 14 whereby the heading "Kickoff return", appears at the upper end of the opening 13 in the chart. If the second player throws or rolls a pair of threes and a pair of fives, the ball is returned ten yards, because the numeral 10 under the heading "Kickoff return" will be horizontally alined with the dice combination thrown. The above constitutes one play and the member 41 is then advanced to the second play.

The ball is then put into play on the twenty yard line, and is advanced forwardly and backwardly on the field, determined by the result of each play. If the player having possession of the ball elects to play a "Rush" or make a "Line drive", the slide 14 is positioned as shown in Figure 1, and the dice are thrown to determine the result of the play. As each play is completed, the various movable elements on the gridiron board are moved to their proper positions to record the result of each play; the element 41 indicating the position of the ball on the field; the member 44 the number of downs played; the slider 43 the number of yards to go for a first down; and the member 47 the number of plays which have been used or completed. As a result of the provision of the symbols 33 and 34 on the slide 14, and in the column 11 at the right hand side of the chart, the result of the play indicated on the slide through the opening 13 in the chart, may change or vary, depending upon the odd dice in each dice combination thrown, as hereinbefore described. If only two players participate in the game, each player will represent a team, and one player will manipulate the movable elements on the gridiron board while the other player operates the slide 14 of the chart.

In Figure 8, there is shown a game comprising a chart 50, similar to the one disclosed in Figure 1. A cylindrical member or roller 52 is used in lieu of the slide 14. The member 52 is provided with rows of numerals extending lengthwise thereof and corresponding to the rows of numerals on the slide 14. Each of said rows of numerals has a heading similar to the headings on the slide 14. The rotatable member 52 may be operated by a suitable knurled wheel 53 secured to its supporting shaft, and having a portion of its periphery projecting through a small slot or opening 54 in the chart 50. The game shown in Figure 8 is played in identically the same manner as the game shown in Figure 1, each play being recorded upon the gridiron board 35.

In Figure 9, there is shown a game of simplified form which embodies all of the different plays and combinations thereof, which may be played in either of the games shown in Figures 1 and 8. The game illustrated in Figure 9 comprises a chart 55 having a column 56 of dice combinations on one section thereof, and another section thereof has a column 57 of information and other indicia relating to football plays, corresponding to the column 11 in Figure 1. The chart shown in Figure 9 differs from those shown in Figures 1 and 8 in that the elongated opening 13 has been dispensed with, and in lieu thereof, a third column 58 is provided between the columns 56 and 57 which bears information similar to that appearing upon the slide 14, shown in Figure 4, and the rotatable member 52, shown in Figure 8. The three columns 56, 57, and 58 are separated by vertically disposed lines 59, and each numeral of the vertically disposed rows of numerals in the column 58 is alined with one of the dice combinations shown in the colunm 56.

In the form shown in Figure 9, a suitable straight edge 61 may be provided for horizontally alining the numerals and information in the columns 58 and 57 with the particular dice combination thrown. By reference to Figure 9, it will be noted that the headings appearing at the top of the column 58, and which designate different plays of the game, are repeated at intervals in the column, whereby the player may readily aline the dice combination thrown with the numeral appearing in the row of numerals under the heading designating the play selected. When the above headings are thus repeated at intervals throughout the length of the column, the straight edge 61 may, if desired, be dispensed with, in which case the entire game may consist of the single chart 55, a set of dice, the gridiron board 35, and the members movably mounted thereon.

An important feature of the game resides in the use of a full set of dice, as shown in Figure 7. By thus using a plurality of dice, a great many more dice combinations are obtainable, which correspondingly increases the number of possible play combinations, and thus renders the game more interesting. The provision of the symbols 33 and 34 also adds interest to the game. These symbols, as hereinbefore stated, cooperate with the dice to change or vary the result of the play indicated by the numeral on the slide 16, which is alined with the particular dice combination thrown, and which numeral is visible through the opening 13 in the chart. The game is played in accordance with standard football rules and regulations, and it has been found very instructive in that to thoroughly enjoy the game, one must have a fair knowledge of the rules of the game, and this is quickly acquired by simply playing the game.

I claim as my invention:

1. In a game apparatus wherein a board is marked off to simulate a playing field and markers are movable thereon in accordance with plays of the game, and wherein a chance device is used to determine the various plays, a chart for use therewith having a column of chance combinations, a column of plays aligned transversely with said chance combinations and an elongated window, and a member movable with respect to said window, said member being movable to expose a column of plays through said window which are in alignment transversely with the combinations and plays in the first two columns, thereby to indicate a play to be made on said board.

2. In a game apparatus wherein a board is marked off to simulate a playing field and markers are movable thereon in accordance with plays of the game, and wherein a chance device is used to determine the various plays, a chart for use therewith having a column of chance combinations, a column of plays aligned transversely with said chance combinations and an elongated window, and a member having a plurality of columns of plays, said member being movable to expose one of said columns of plays through said window, the plays in each column on said movable member being in alignment transversely with the combinations and plays in the first two columns, and the column of plays on said chart and the selected column of plays on said movable member jointly indicating a play to be made on said board.

WALTER H. LUNDQUIST.